(12) United States Patent
Hill (10) Patent No.: US 7,976,729 B2
(45) Date of Patent: Jul. 12, 2011

(54) STABILIZED POLYMER COMPOSITIONS

(75) Inventor: Jonathan S. Hill, Flixton (GB)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/291,102

(22) Filed: Nov. 5, 2008

(65) Prior Publication Data

US 2009/0170990 A1 Jul. 2, 2009

Related U.S. Application Data

(60) Provisional application No. 61/018,575, filed on Jan. 2, 2008.

(51) Int. Cl.
| | |
|---|---|
| *C09K 15/16* | (2006.01) |
| *C09K 15/00* | (2006.01) |
| *C09K 3/00* | (2006.01) |
| *C08K 5/00* | (2006.01) |
| *C08K 5/13* | (2006.01) |
| *C08G 73/10* | (2006.01) |

(52) U.S. Cl. .............. 252/401; 252/182.23; 252/182.24; 252/404; 524/236; 524/323

(58) Field of Classification Search .................. 252/401, 252/182.23, 182.24, 404; 524/236, 323
See application file for complete search history.

(56) References Cited

U.S. PATENT DOCUMENTS

| | | | | |
|---|---|---|---|---|
| 4,898,901 | A | * | 2/1990 | Ravichandran et al. ....... 524/237 |
| 5,844,029 | A | * | 12/1998 | Prabhu et al. ................. 524/236 |
| 6,444,733 | B1 | * | 9/2002 | Stadler .......................... 524/100 |
| 6,664,317 | B2 | * | 12/2003 | King, III ......................... 524/99 |
| 2005/0209379 | A1 | | 9/2005 | Botkin et al. |

FOREIGN PATENT DOCUMENTS

| | | |
|---|---|---|
| WO | WO 01/81458 A1 | 11/2001 |
| WO | WO 2005/23886 A1 | 3/2005 |

* cited by examiner

*Primary Examiner* — Lorna M Douyon
*Assistant Examiner* — Tanisha Diggs
(74) *Attorney, Agent, or Firm* — Joseph Suhadolnik (57) ABSTRACT

A composition for stabilizing organic polymers comprising a sterically hindered phenol produced by reacting p-cresol and dicyclopentadiene to produce a precursor and alkylating the precursor with isobutylene, and a tertiary amine oxide.

1 Claim, 4 Drawing Sheets

Figure 7

STABILIZED POLYMER COMPOSITIONS

CROSS REFERENCE TO RELATED APPLICATIONS

This application claims the benefit of the filing date of U.S. Provisional Application No. 61/018,575 filed Jan. 2, 2008, the entire contents of which are incorporated herein by reference.

FIELD

This invention relates to stabilized polymer compositions.

BACKGROUND

It is well known that phenolic compounds are effective in stabilizing polymer compositions against the degradation caused by exposure to heat, oxygen and shear forces experienced during melt processing. However, it is also known that the use of phenolic stabilizers tends to be accompanied by discoloration of the polymer composition and so polymer stabilization generally involves the use of a combination of additives designed to achieve a combination of stabilization and color retention.

For example, U.S. Pat. No. 4,590,231 discloses a stabilized polyolefin composition containing a phenolic antioxidant and an ultraviolet light absorber which is stabilized against discoloration upon exposure to heating, to the combustion products of natural gas or to storage for prolonged periods at ambient temperatures by the presence of a hydroxylamine derivative of the formula $T_1N(OH)T_2$ where $T_1$ is alkyl of 1 to 36 carbon atoms, cycloalkyl of 5 to 12 carbon atoms, aralkyl of 7 to 9 carbon atoms, or said aralkyl substituted by alkyl of 1 to 4 carbon atoms or by one or two halogen atoms, $T_2$ is hydrogen, or independently has the same meaning as $T_1$; and the carbon content of $T_1$ and $T_2$ together is 6 to 36 carbon atoms. Preferred phenolic antioxidants include neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl) isocyanurate, 2,6-di-tert-butyl-p-cresol and 2,2'-ethylidenebis(4,6-di-tert-butylphenol).

A similar stabilized polyolefin composition containing a phenolic antioxidant combined with a long chain N,N-dialkylhydroxyamine is disclosed in U.S. Pat. No. 4,876,300. Preferred phenolic antioxidants include n-octadecyl 3,5-di-tert-butyl-4-hydroxyhydrocinnamate, neopentanetetrayl tetrakis (3,5-di-tert-butyl-4-hydroxyhydrocinnamate), di-noctadecyl 3,5-di-tert-butyl-4-hydroxybenzylphosphonate, 1,3,5-tris(3,5-di-tert-butyl-4-hydroxybenzyl) isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)iso-cyanurate, 1,1,3-tris(2-methyl-4-hydroxy-5-tert-butylphenyl)butane, 1,3,5-tris[2-(3,5-di-tertbutyl4-hydroxyhydrocinnamoyloxy)-ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,-5-di(octylthio)-s-triazine, N,N'-hexamethylene-bis(3,5-di-tert-butyl-4-hydroxyhydrocinnamamide), calcium bis(O-ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2(3,5-di-tert-butyl-4-hydroxyhydrocinnamoyloxy)-ethyl] oxamide and 3,6-dioxaoctamethylene bis(3,5-di-tert-butyl-4hydroxyhydrocinnamate).

U.S. Pat. No. 5,844,029 discloses a method for improving the yellowness index and melt stability of a thermoplastic resin by admixing therewith a saturated hydrocarbon amine oxide and a second stabilizer. The amine oxide has the formula $R^1R^2R^3N{\rightarrow}O$, wherein $R^1$, $R^2$ and $R^3$ are independently selected from alkyl, aryl, aralkyl, alkaryl, cycloalkyl, alkcycloalkyl and cycloalkalkyl and each have from 1 to 36 carbon atoms per group, provided that if one $R^1$, $R^2$ and $R^3$ is an alkyl group having from 6 to 36 carbon atoms per group, then the other two of $R^1$, $R^2$ and $R^3$ cannot both be alkyl groups having from 1 to 5 carbon atoms per group. The second stabilizer is selected from selected from phenolic antioxidants, hindered amine light stabilizers, ultraviolet light absorbers, organic phosphorus compounds, alkaline metal salts of fatty acids, and thiosynergists.

U.S. Pat. No. 5,922,794 discloses a stabilized thermoplastic resin composition includes a stabilizing amount of (a) a stabilizer selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, and the thiosynergists, and (b) a stabilizing amount of a tertiary amine oxide selected from the group consisting of dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$-$C_{22}$) amine oxide, di($C_{20}$-$C_{22}$ alkyl) methyl amine oxide, and mixtures thereof. Preferred phenolic antioxidants include n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis (3,5-di-tert-butyl-4-hydroxyhydrocinnamate), 1,3,5-methyl-2,4-6-tris(3,5-di-tert-butyl-4-hydroxybenzyl)benzene, 3,6-di-oxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris (2-methyl-4-hydroxy-5-tert-butylphenyl)butane, 1,3,5-tris[2-(3,5-di-tert-butyl-4-hydroxyhydrocinnamoyloxy)-ethyl]-isocyanurate, 3,5-di-(3,5-di-tert-butyl-4-hydroxybenzyl)-mesitol, hexamethylene bis(3,5-di-tert-butyl-4-hydroxyhydrocinnamate), 1-(3,5-di-tert-butyl-4-hydroxyanilino)-3,-5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2-(3,5di-tert-butyl-4-hydroxyhydroxocinnamoyloxy)ethyl] oxamide.

US Published Patent Application No 2006/0089437 discloses a liquid stabilizing mixture for organic polymers or copolymers comprising: (a) a liquid compound selected from the group consisting of esters or mixtures of esters of sterically hindered phenols having the formula wherein $R_1$ and $R_2$, the same or different, are a linear or branched $C_1$-$C_{18}$ alkyl group and $R_3$ is a linear or branched $C_8$-$C_{18}$ alkyl group, and (b) solid compound selected from the group consisting of sterically hindered phenols having the formula:

wherein n is an integer ranging from 0 to 10 and wherein the mixture is permanently liquid both at room temperature and temperatures as low as −30° C. The liquid stabilizing mixture can also include a wide variety of co-stabilizers such as phosphites; such as tris(2,4-di-t-butylphenyl) phosphite; hydroxylamines, such as N,N-dihexadecylhydroxylamine and N,N-dioctadecylhydroxylamine; and nitrons, such as N-tetradecyl-α-tridecyl-nitron, N-hexadecyl-α-pentadecyl-nitron, and N-octadecyl-α-heptadecyl-nitron.

The solid sterically hindered phenol disclosed in US Published Patent Application No 2006/0089437 is the reaction product of p-cresol, dicyclopentadiene and isobutylene and is commercially available under the tradename Lowinox® CPL. Lowinox® CPL is known as a polymer antioxidant with low discoloring properties. However, according to the present invention, it has now been found combining Lowinox® CPL with a tertiary amine oxide can produce a polymer stabilizing composition with an unexpected and highly advantageous combination of color retention and antioxidant properties.

SUMMARY

In one aspect, the invention resides in a composition for stabilizing organic polymers comprising:
(a) a sterically hindered phenol produced by reacting p-cresol and dicyclopentadiene to produce a precursor and alkylating the precursor with isobutylene; and
(b) a tertiary amine oxide. In a further aspect, the invention resides in a composition for stabilizing organic polymers comprising a mixture of:
(a) a sterically hindered phenol having the formula:

wherein n is an integer ranging from 0 to 10; and
(b) a tertiary amine oxide.

Conveniently, the tertiary amine oxide has the following formula:

$$R^1R^2R^3N\rightarrow O$$

wherein $R^1$, $R^2$ and $R^3$ are independently selected from alkyl, aryl, aralkyl, alkaryl, hydroxyalkyl (especially 2-hydroxyalkyl), cycloalkyl, alkcycloalkyl and cycloalkalkyl and each have from 1 to 36 carbon atoms per group. In one embodiment, $R^1$ is a methyl group and $R^2$ and $R^3$ can be the same or different and each is an alkyl group having from 14 to 24 carbon atoms.

Conveniently, the tertiary amine oxide is present in an amount between about 5 and about 80% by weight of the composition.

In yet a further aspect, the invention resides in a stabilized polymer composition comprising:
(a) at least one organic polymer or copolymer;
(b) a sterically hindered phenol produced by reacting p-cresol and dicyclopentadiene to produce a precursor and alkylating the precursor with isobutylene; and
(c) a tertiary amine oxide.

Conveniently, the combination of components (a) and (b) is present in an amount between about 0.01 and about 0.5 % by weight of overall polymer composition.

In yet a further aspect, the invention resides in a solid composition for stabilizing organic polymers comprising:
(a) a sterically hindered phenol produced by reacting p-cresol and dicyclopentadiene to produce a precursor and alkylating the precursor with isobutylene; and
(b) at least one of a tertiary amine oxide, an alkylhydroxylamine and a nitrone.

DETAILED DESCRIPTION OF THE EMBODIMENTS

Described herein is a stabilizing composition for organic polymers wherein the composition comprises a synergistic combination of (a) a sterically hindered phenol produced by alkylating the reaction product of p-cresol and dicyclopentadiene with isobutylene and (b) a tertiary amine oxide. In another embodiment, the present invention is directed to a solid stabilizing composition for organic polymers wherein the composition comprises a synergistic combination of (a) a sterically hindered phenol produced by alkylating the reaction product of p-cresol and dicyclopentadiene with isobutylene and (b) at least one of a tertiary amine oxide, an alkylhydroxylamine and a nitron. When added to an organic polymer, such as polypropylene, the present compositions provide the polymer with effective antioxidant properties with minimal discoloration of the polymer.

The sterically hindered phenol employed in the present composition is a commercial product, sold under the tradename Lowinox® CPL by Chemtura Corporation, but can be prepared by the reaction of p-cresol with dicyclopentadiene and subsequent alkylation with isobutylene, in the presence of acid catalysts such as, for example, boron trifluoride, methanesulfonic acid, p-toluene-sulfonic acid, etc., as described, for example, in the patent GB 1,068,995. Generally, the material can be characterized by the formula (I):

The sterically hindered phenol described above is typically present in the stabilizing composition in an amount between about 20 wt % and about 95 wt % by weight, especially between about 50 wt % and about 90 wt % by weight, of the stabilizing composition.

The tertiary amine oxide employed in the present stabilizing composition is typically a saturated trialkyl amine oxide as represented by general formula (II):

$R^1R^2R^3N{\rightarrow}O$ wherein $R^1$, $R^2$ and $R^3$ are independently selected from alkyl, aryl, aralkyl, alkaryl, hydroxyalkyl (especially 2-hydroxyalkyl), cycloalkyl, alkcycloalkyl and cycloalkalkyl and each have from 1 to 36 carbon atoms per group. In one embodiment, $R^1$ is a methyl group and $R^2$ and $R^3$ can be the same or different and each is an alkyl group having from 14 to 24 carbon atoms. Conveniently, one or more of the groups $R^1$, $R^2$ and $R^3$ contains at least one —O—, —S—, —SO—, —$CO_2$—, —CO—, or —CON— moiety.

Amine oxides and processes for making thereof are set out in Richard J. Nadolsky Amine Oxides Encyclopedia of Chemical Technology, Vol. 2, pages 259-271, John Wiley & Sons, Inc. (1978), which is incorporated herein by reference.

The tertiary amine oxide employed herein may also include a poly(amine oxide). By poly(amine oxide) is meant tertiary amine oxides containing at least two tertiary amine oxides per molecule. Illustrative poly(amine oxides) (also called "poly(tertiary amine oxides)") include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles. Also included are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. Generally a useful number of amine oxide moieties in the overall thermoplastic resin is between about 0.001 weight percent and about 5 weight percent, based on the weight of the entire thermoplastic composition. All of the aforementioned amine oxides may optionally contain at least one —O—, —S—, —SO—, —$CO_2$—, —CO—, or —CON— moiety. In a preferred embodiment, each tertiary amine oxide of the polymeric tertiary amine oxide contains a $C_1$ residue.

In a further embodiment, the tertiary amine oxide may be attached to a molecule containing a hindered amine. Hindered amines are known in the art and the amine oxide used herein may be attached to the hindered amine in any manner and structural position of the hindered amine. Useful hindered amines include those of the general formulas:

wherein K is a carbon chain containing the amine oxide (or amine oxides), Y is a $C_{1-30}$ alkyl moiety, a —C(O)R moiety wherein R is a $C_{1-30}$ alkyl group, or a —OR moiety wherein R is a $C_{1-30}$ alkyl group, and each $R^4$ is independently a $C_{1-30}$ alkyl group, preferably a methyl group. Also included are amine oxides containing more than one hindered amine and more than one saturated amine oxide per molecule. The hindered amine may be attached to a poly(tertiary amine oxide) or attached to a polymeric substrate, as discussed above.

Also useful in the present stabilizing composition are thermal reaction products of tertiary amine oxides. Under elevated temperatures, e.g., such as those useful to prepare the thermoplastic compositions, amine oxides are believed to undergo various reactions. Some of these reactions are believed to result in the formation of various thermal reaction products, for example, hydroxyl amines and olefinic species. Although the mechanism for the stabilization of various resins with the tertiary amine oxides is presently unknown, it is believed that various reactive intermediates along the reaction pathways may play a role in the stabilization effect.

Amine oxide reaction products containing at least one long chain carbon residue are preferred in order to increase the solubility of the reaction products, including the hydroxyl amine-type reaction products, with the thermoplastic resin. When only a single alkyl substituent (i.e., only one of $R^1$, $R^2$ and $R^3$) in the tertiary amine oxide is a $C_6$ to $C_{36}$ residue and the other two alkyl substituents are $C_{1-5}$ residues, some of the hydroxyl amine-type reaction products are believed to contain only short chain substituents (i.e., $C_{1-5}$ residues). It is believed that this is a result of some of the long chain residues being eliminated from the amine oxide as an olefinic by-product. In order to insure that at least one long chain is retained in the hydroxyl amine-type thermal reaction products, either all three substituents should preferably be long chain or one chain can be methyl and the other two substituents be long chain (e.g., $C_6$ to $C_{36}$ residues). When one substituent is a methyl residue and the other two substituents are long chain residues (including polymeric residues as previously described), the resultant thermal reaction product will be asymmetrical and contain a methyl residue and a long chain residue. By long chain carbon residue is meant from $C_6$ to $C_{36}$, such as from $C_8$ to $C_{26}$, for example from $C_{10}$ to $C_{22}$. Also included by long chain residue are the before mentioned polymeric amine oxide residues. The long chain carbon residue may also optionally contain at least one of the before mentioned —O—, —S—, —SO—, —CO$_2$—, —CO—, or —CON— moieties described for $R^1$, $R^2$ and $R^3$.

Suitable tertiary amine oxides for use in the present composition include dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{14}$-$C_{24}$ alkyl) amine oxide, $C_{10}$-$C_{24}$ alkyl dimethyl amine oxide, $C_{10}$-$C_{24}$ alkyl bis (hydroxyethyl) amine oxide, di($C_{14}$-$C_{24}$ alkyl) methyl amine oxide, tri($C_{20}$-$C_{22}$ alkyl) amine oxide, and di($C_{20}$-$C_{22}$ alkyl) methyl amine oxide. An example of a commercially available tertiary amine oxide suitable for use in the present composition is Genox EP supplied by Chemtura Corporation.

The tertiary amine oxide is typically present in the stabilizing composition in an amount between about 5 wt % and about 80 wt %, especially between about 10 wt % and about 50 wt % by weight, by weight of the stabilizing composition.

Where the stabilizing composition contains an alkylhydroxylamine, the alkylhydroxylamine conveniently has the formula $T_1N(OH)T_2$ where $T_1$ is alkyl of 1 to 36 carbon atoms, cycloalkyl of 5 to 12 carbon atoms, aralkyl of 7 to 9 carbon atoms, or said aralkyl substituted by alkyl of 1 to 4 carbon atoms or by one or two halogen atoms, $T_2$ is hydrogen, or independently has the same meaning as $T_1$; and the carbon content of $T_1$ and $T_2$ together is 6 to 36 carbon atoms.

Examples of suitable alkylhydroxylamines include N,N-di-tert-butylhydroxylamine, N,N-di-n-octylhydroxylamine, N-cyclohexylhydroxylamine, N-cyclododecylhydroxylamine, N,N-dicyclohexylhydroxylamine or N,N-dibenzylhydroxylamine, or a mixture thereof.

In one preferred embodiment, the alkylhydroxylamine is a long chain N,N-dialkylhydroxylamine of the formula $T_1T_2N(OH)$ where $T_1$ and $T_2$ are independently alkyl of 12 to 18 carbon atoms. Conveniently, $T_1$ and $T_2$ are independently dodecyl, tetradecyl, hexadecyl, heptadecyl or octadecyl. Most preferably $T_1$ and $T_2$ are the alkyl mixture found in hydrogenated tallow amine.

Where the stabilizing composition contains an alkylhydroxylamine, the alkylhydroxylamine is typically present in the stabilizing composition in an amount between about 5 wt % and about 80 wt %, preferably between about 10 wt % and about 50 wt % by weight, by weight of the stabilizing composition.

Where the stabilizing composition contains a nitrone, the nitrone is cconveniently a long chain N-alkyl-alpha-alkyl nitrone of the formula:

wherein T is a straight or branched chain alkyl of 8 to 18 carbon atoms, G is hydrogen, methyl or ethyl, E is a straight or branched chain alkyl of 5 to 17 carbon atoms, and the sum of the carbon atoms in G plus E is equal to 7 to 17. Preferably T is n-octyl, n-decyl, dodecyl, tetradecyl, hexadecyl, heptadecyl or octadecyl and more preferably is the alkyl mixture found in hydrogenated tallow amine. Preferably G is hydrogen or methyl, especially hydrogen. Preferably E is n-heptyl, n-nonyl, undecyl, tridecyl, pentadecyl, hexadecyl or heptadecyl. Most preferably E is the alkyl mixture found in hydrogenated tallow amine with one less carbon atom per alkyl group.

Where the stabilizing composition contains a nitrone, the nitrone is typically present in the stabilizing composition in an amount between about 5 wt % and about 80 wt %, preferably between about 10 wt % and about 50 wt % by weight, by weight of the stabilizing composition.

In addition to the sterically hindered phenol of formula I and the tertiary amine oxide, hydroxylamine and/or nitrone, the present stabilizing composition can include one or more additional stabilizing compounds, such as other phenolic antioxidants, hindered amine stabilizers, ultraviolet light absorbers, organic phosphorus compounds, alkaline metal salts of fatty acids, and thiosynergists. Examples of such additional stabilizing compounds are described in detail in U.S. Pat. No. 5,922,794 and US Published Patent Application No 2006/0089437, the entire contents of which are incorporated herein by reference.

Particularly preferred additional stabilizing compounds are phenolic antioxidants selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)-isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3- tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl4-hydroxyanilino)-3,5-di(octylthio)-s-triazine, N,N'-hexamethylene-bis(3,5-di-tert-butyl-4-hydroxyhydrocinnamamide), calcium bis(ethyl-3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-di-tert-butyl-4-hydroxyhydrocinnamoyloxy)ethyl]-oxamide.

The stabilizing composition described herein can be used to stabilize any thermoplastic organic polymer known in the art, such as polyesters, polyurethanes, polyalkylene terephthalates, polyketones, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/styrenic resin blends, polyvinyl chloride/ABS or other impact modified polymers, such as methacrylonitrile and .alpha.-methylstyrene containing ABS, and polyester/ABS or polycarbonate/ABS and polyester plus some other impact modifier may also be used. Such polymers are available commercially or may be made by means well known in the art. However, the present stabilizer compositions particularly useful with thermoplastic polymers, such as polyolefins, polycarbonates, polyesters, polyphenylene ethers and styrenic polymers, due to the extreme temperatures at which thermoplastic polymers are often processed and/or used.

The invention will now be more particularly described with reference to the following Examples.

EXAMPLE 1

A series of tests were undertaken to establish the ability of various antioxidant combinations to stabilize the polypropylene resin Moplen HF550N supplied by Basell Polyolefins. Moplen HF500N is a flake form homopolymer, suitable for extrusion applications, and has the properties summarized in Table 1.

TABLE 1

| Property | Value |
| --- | --- |
| Tensile Modulus | 1700 MPa |
| Melt flow rate (MFR) | 12 g/10 min (230° C./2.16 Kg) |
| Melt volume flow rate | 16 cm$^3$/10 min (230° C./2.16 Kg) |

The antioxidants employed in the test were:

Anox 20 tetrakismethylene(3,5-di-tert-butyl-4-hydroxyhydrocinnamate) methane

Alkanox 240 (tris(2,4-di-tert-butylphenyl)phosphate)

Genox EP

Lowinox CPL,

In each test, a sample of the polypropylene resin was mixed with calcium stearate (an acid scavenger) and with one or more of the above antioxidants in a Stephan High Speed Mixer for 2 minutes at 3000 rpm. The resulting formulation was then passed 5 times in air through a Brabender PLE 2000 Nr. 3 extruder operating at a screw speed of 60 rpm and with the temperature profile being 200-225-250-275° C. Samples of each formulation were taken after the first, third and fifth pass through the extruder and were subjected to melt flow index (MFI) and color (yellowing) index testing. The MFI test was conducted using a Ceast Automatic Nr. 2 according to ISO 1133 at a temperature of 230° C. and a load of 2.16 kg, whereas the color index test was conducted using a Macbeth Color-Eye 3000 spectrometer according ASTM-E-313. The results of the tests are summarized in Tables 2 to 4 and FIGS. 1 to 4.

TABLE 2

| | Formulations | | | | | | | |
| --- | --- | --- | --- | --- | --- | --- | --- | --- |
| | REF | A | B | C | D | E | F | G |
| PP, HF-500N | 99.85 | 99.85 | 99.85 | 99.85 | 99.9375 | 99.85 | 99.85 | 99.85 |
| Ca Stearate | 0.05 | 0.05 | 0.05 | 0.05 | 0.05 | 0.05 | 0.05 | 0.05 |
| Anox 20 | 0.05 | | | | | | | |
| Alkanox 240 | 0.05 | | | | | | | |
| Lowinox CPL | | 0 | 0.02 | 0.04 | 0.05 | 0.06 | 0.08 | 0.1 |
| Genox EP | | 0.1 | 0.08 | 0.06 | 0.05 | 0.04 | 0.02 | 0 |
| PP, HF-500N Basell | 1298.05 | 1298.05 | 1298.05 | 1298.05 | 1299.188 | 1298.05 | 1298.05 | 1298.05 |
| Ca Stearate | 0.65 | 0.65 | 0.65 | 0.65 | 0.65 | 0.65 | 0.65 | 0.65 |
| Anox 20 | 0.65 | | | | | | | |
| Alkanox 240 | 0.65 | | | | | | | |
| Lowinox CPL | | 0 | 0.26 | 0.52 | 0.65 | 0.78 | 1.04 | 1.3 |
| Genox EP | | 1.3 | 1.04 | 0.78 | 0.65 | 0.52 | 0.26 | 0 |
| Total | 1300 | 1300 | 1300 | 1300 | 1300 | 1300 | 1300 | 1300 |

TABLE 2

MFI Results

| MFI 2.16 kg | Lowinox CPL to Genox EP ratio ||||||| 
|---|---|---|---|---|---|---|---|
| | 1:0 (G) | 4:1 (F) | 3:2 (E) | 1:1 (D) | 2:3 (C) | 1:4 (B) | 0:1 (A) |
| Pass 1 | 13.17 | 12.72 | 12.30 | 13.02 | 12.72 | 12.33 | 12.66 |
| Pass 3 | 14.76 | 14.97 | 14.03 | 14.72 | 15.38 | 14.20 | 14.49 |
| Pass 5 | 16.29 | 16.30 | 16.94 | 16.36 | 16.34 | 16.80 | 16.16 |

TABLE 3

Color Index Results

| YI | Lowinox CPL to Genox EP ratio |||||||
|---|---|---|---|---|---|---|---|
| | 1:0 (G) | 4:1 (F) | 3:2 (E) | 1:1 (D) | 2:3 (C) | 1:4 (B) | 0:1 (A) |
| Pass 1 | 8.476 | 0.757 | 0.083 | 0.052 | −0.046 | −0.363 | −1.063 |
| Pass 3 | 16.843 | 3.471 | 2.378 | 1.814 | 1.147 | 1.038 | 0.134 |
| Pass 5 | 21.550 | 7.851 | 4.591 | 3.394 | 3.010 | 2.286 | 1.001 |

The results show that the blend of Lowinox CPL and Genox EP provides a big improvement in YI compared to the use of Lowinox CPL alone, without any negative impact on MFI. This effect is even seen with a small amount of Genox EP in the blend such as with formulation F.

EXAMPLE 2

A series of tests were undertaken to establish the ability of various antioxidant blends to stabilize the high density Cr-catalyst based polyethylene resin supplied by Borealis as BL2571-N and having the properties summarized in Table 4.

TABLE 4

| Property | Value |
|---|---|
| Density | 1700 MPa |
| Melt flow rate (MFR) | 29.378 g/10 min |
| | (190° C., 21.5 kg) |
| Melt flow rate (MFR) | 5.815 g/10 min |
| | (190° C./10 kg) |

Figure 1:
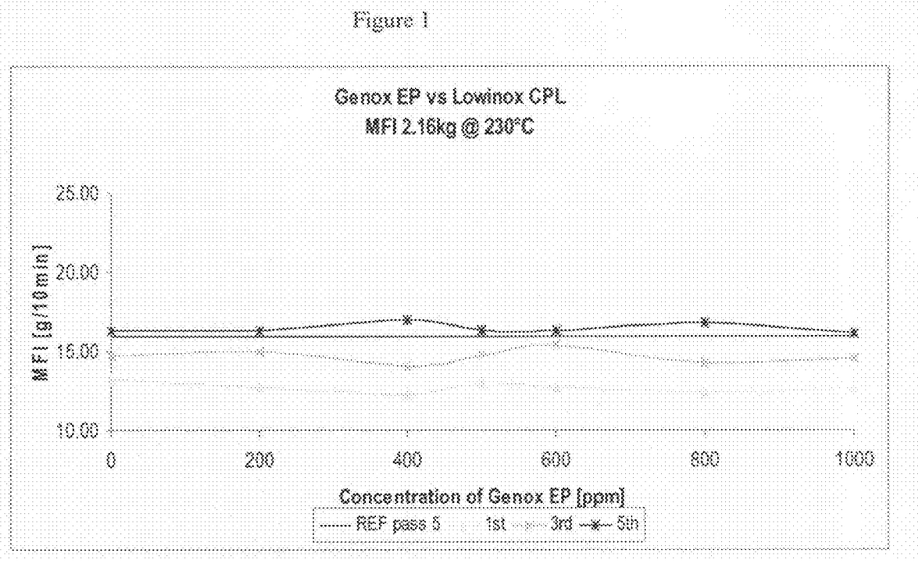
FIG. 1 is a graph plotting melt flow index against concentration of Genox EP in the extruded stabilized polypropylene formulations of Example 1.
Figure 2:
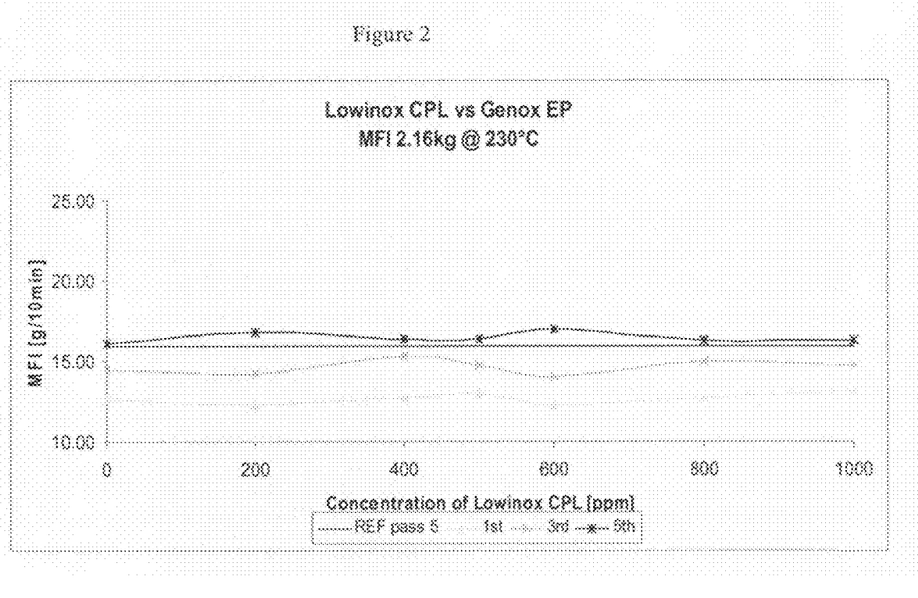
FIG. 2 is a graph plotting melt flow index against concentration of Lowinox CPL in the extruded stabilized polypropylene formulations of Example 1.
Figure 3:
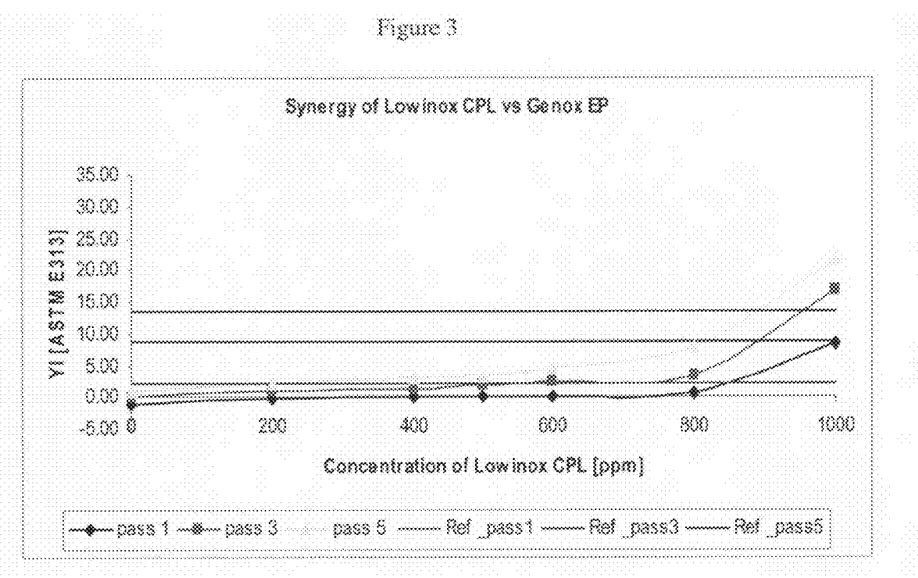
FIG. 3 is a graph yellowing index against concentration of Genox EP in the extruded stabilized polypropylene formulations of Example 1.
Figure 4:
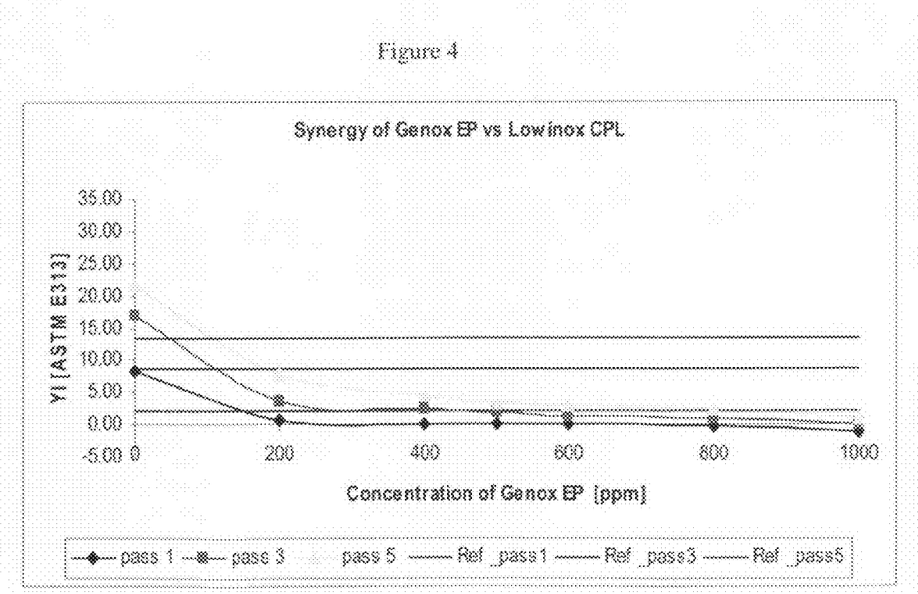
FIG. 4 is a graph plotting yellowing index against concentration of Lowinox CPL in the extruded stabilized polypropylene formulations of Example 1.
Figure 5:
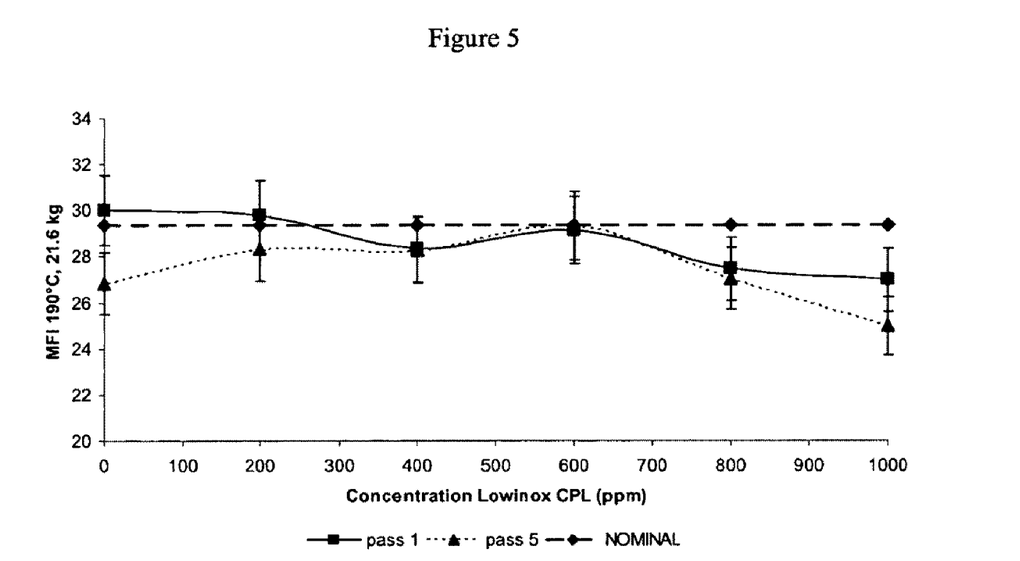
FIG. 5 is a graph plotting melt flow index at 190° C. and 21.5 kg against concentration of Lowinox CPL in the extruded stabilized high density polyethylene formulations of Example 2.
Figure 6:
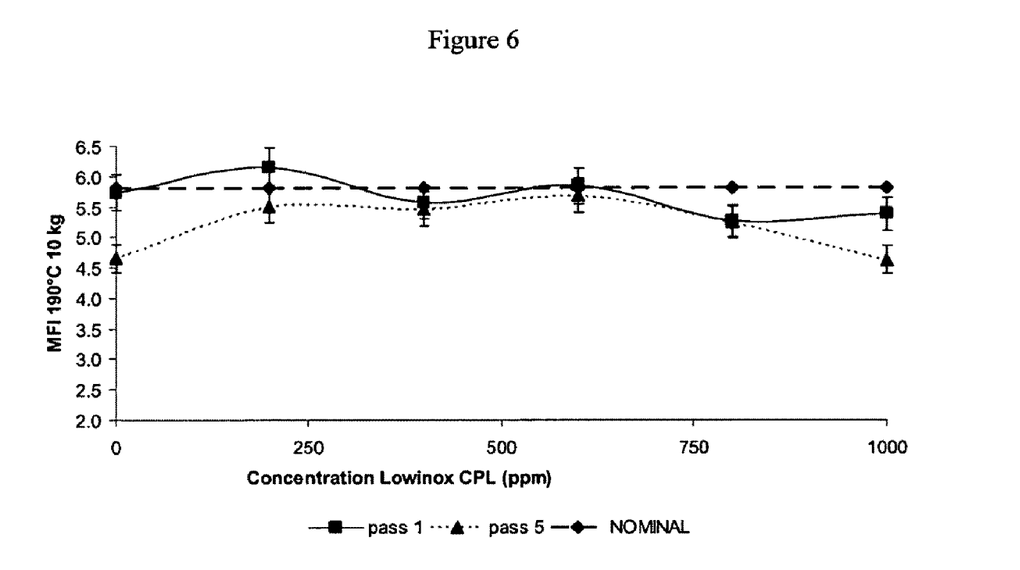
FIG. 6 is a graph plotting melt flow index at 190° C. and 10 kg against concentration of Lowinox CPL in the extruded stabilized high density polyethylene formulations of Example 2.
Figure 7:
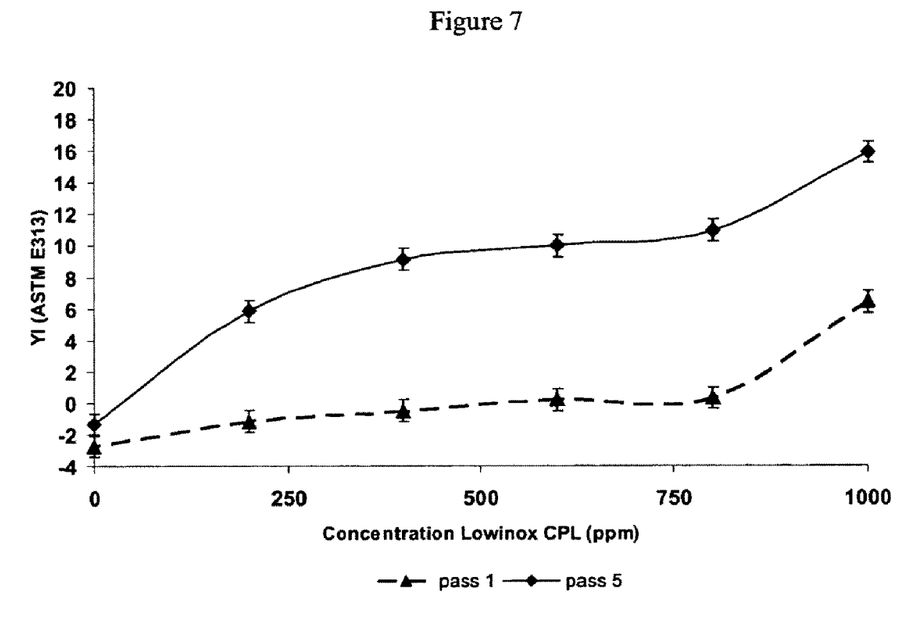
FIG. 7 is a graph plotting yellowing index against concentration of Lowinox CPL in the extruded stabilized high density polyethylene formulations of Example 2.

In each test, 99.85 parts by weight of the polyethylene resin was mixed with 0.05 parts by weight of zinc stearate (an acid scavenger) and with 0.1 parts by weight of one of the blends of Lowinox CPL and Genox EP shown in Table 5. Mixing was conducted in a Stephan High Speed Mixer for 2 minutes at 3000 rpm. The resulting formulation was then passed 5 times in air through a Brabender PLE 2000 Nr. 3 extruder operating at a screw speed of 60 rpm and with the temperature profile being 200-225-250-275° C. Samples of each formulation were taken after the first, third and fifth pass through the extruder and were subjected to melt flow index (MFI) and color (yellowing) index testing. The MFI test was conducted using a Ceast Automatic Nr. 2 according to ISO 1133 at a temperature of 230° C. and a load of 2.16 kg, whereas the color index test was conducted using a Macbeth Color-Eye 3000 spectrometer according ASTM-E-313. The results of the tests are summarized in Table 5 and FIGS. 5 to 7, from which it will be seen that significant yellowing (YI) reduction was obtained over the full range of 20:80 to 80:20 Lowinox CPL:Genox EP formulations compared to formulation containing 1000 ppm Lowinox CPL. Optimum MFI performance was seen at 60:40 Lowinox CPL:Genox EP.

TABLE 5

| Lowinox CPL (ppm) | Genox EP (ppm) | MFI 190° C. 10 kg (g/min) Pass 1 | MFI 190° C. 10 kg (g/min) Pass 5 | MFI 190° C. 21.6 kg (g/min) Pass 1 | MFI 190° C. 21.6 kg (g/min) Pass 5 | YI Pass 1 | YI Pass 5 |
|---|---|---|---|---|---|---|---|
| 0 | 1000 | 5.8 | 4.7 | 30 | 26.8 | −3 | −1.4 |
| 200 | 800 | 6.1 | 5.5 | 29.8 | 28.2 | −1.4 | 5.8 |
| 400 | 600 | 5.5 | 5.5 | 28.2 | 28.2 | −1 | 8.4 |
| 600 | 400 | 5.8 | 5.7 | 29 | 29.2 | −0.2 | 9.8 |
| 800 | 200 | 5.4 | 5.4 | 27.4 | 27 | −0.2 | 10.2 |
| 1000 | 0 | 5.5 | 4.8 | 27 | 25.2 | 6.4 | 15.4 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A composition for stabilizing organic polymers consisting of a mixture of:

(a) a sterically hindered phenol having the formula:

-continued wherein n is an integer ranging from 0 to 10; and (b) a tertiary amine oxide having the formula:

$$R^1R^2R^3N \rightarrow O$$

wherein $R^1$ is a methyl group and $R^2$ and $R^3$ can be the same or different and each is an alkyl group having from 14 to 24 carbon atoms and wherein the sterically hindered phenol is present in an amount between about 20 and about 95% by weight of the mixture of (a) and (b).

* * * * *